US011929815B2

United States Patent
Spoof et al.

(10) Patent No.: US 11,929,815 B2
(45) Date of Patent: Mar. 12, 2024

(54) RECEIVER SYSTEM CONFIGURED TO ALTERNATE BETWEEN DIFFERENT BEAMFORMING TYPES

(71) Applicant: SAAB AB, Linköping (SE)

(72) Inventors: Kalle Spoof, Helsinki (FI); Marko Kosunen, Helsinki (FI); Jussi Ryynanen, Espoo (FI); Miikka Tenhunen, Espoo (FI); Vishnu Unnikrishnan, Espoo (FI); Kari Stadius, Helsinki (FI)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/253,161

(22) PCT Filed: Nov. 19, 2021

(86) PCT No.: PCT/SE2021/051158
§ 371 (c)(1),
(2) Date: May 16, 2023

(87) PCT Pub. No.: WO2022/108513
PCT Pub. Date: May 27, 2022

(65) Prior Publication Data
US 2023/0396310 A1    Dec. 7, 2023

(30) Foreign Application Priority Data
Nov. 23, 2020  (FI) .................................... 20206192

(51) Int. Cl.
*H04B 7/08*  (2006.01)
*H04B 7/0413*  (2017.01)

(52) U.S. Cl.
CPC ......... *H04B 7/0868* (2013.01); *H04B 7/0413* (2013.01); *H04B 7/0882* (2013.01)

(58) Field of Classification Search
CPC .. H04B 7/0413; H04B 7/0868; H04B 7/0882; H04B 7/0617
See application file for complete search history.

(56) References Cited

U.S. PATENT DOCUMENTS 9,793,910 B1 * 10/2017 Devarajan ............. H03M 1/124
2020/0083936 A1    3/2020 Gupta et al.
(Continued)

FOREIGN PATENT DOCUMENTS

WO    WO 2016/078565 A1    5/2016

OTHER PUBLICATIONS

Dai, Yucheng, et al., "A New Receiver Architecture for MIMO Beam-Forming Applications," GLOBECOM 2017—2017 IEEE Global Communications Conference, Dec. 4-8, 2017, 6 pages, IEEE, Singapore.
(Continued)

*Primary Examiner* — Rahel Guarino
(74) *Attorney, Agent, or Firm* — Alston & Bird LLP

(57) ABSTRACT

A system (1) for beamforming of incoming radio-frequency signals is provided. The system includes at least one digital signal processor, DSP, a plurality of analogue-to-digital converters, ADC, each connected to the at least one DSP. Further, the system comprises a plurality of sample-and-hold, S&H, circuit groups, each comprising a plurality of sample-and-hold circuits additively connected to a respective ADC and a plurality of receiving antenna connections each connected to a respective S&H circuit in each group at one end and each antenna connection connected to a respective antenna. The system is configured to selectively alternate between a plurality of beamforming functionalities, wherein the receiver system is arranged to time-interleave the ADCs and control specific S&H circuits in each S&H group by at least one of time-interleave or disable specific (Continued)

S&H circuits depending on a set beamforming functionality. An associated method (100) is also provided.

16 Claims, 9 Drawing Sheets

(56)  References Cited

U.S. PATENT DOCUMENTS

2020/0091608 A1  3/2020  Alpman et al.
2020/0195327 A1  6/2020  Ganesan et al.

OTHER PUBLICATIONS

Finnish Patent and Registration Office, Search Report and Opinion on Patentability received for Application No. 20206192, dated Jun. 9, 2021, 7 pages, FI.
Ghaderi, Erfan, et al., "An Integrated Discrete-Time Delay-Compensating Technique for Large-Array Beamformers," IEEE Transactions on Circuits and Systems—I: Regular Papers, Sep. 2019, pp. 3296-3306, vol. 66, No. 9, IEEE, US.
International Searching Authority, International Search Report and Written Opinion received for International Application No. PCT/SE2021/051158, dated Jan. 10, 2022, 11 pages, Swedish Patent and Registration Office, Sweden.
Spoof, Kalle, et al., "True-Time-Delay Beamforming Receiver With RF Re-Sampling," IEEE Transactions on Circuits and Systems—I: Regular Papers, Dec. 2020, pp. 4457-4469, vol. 67, No. 12, IEEE, US.

\* cited by examiner

RECEIVER SYSTEM CONFIGURED TO ALTERNATE BETWEEN DIFFERENT BEAMFORMING TYPES

CROSS REFERENCE TO RELATED APPLICATIONS

This application is a National Stage Application, filed under 35 U.S.C. 371, of International Application No. PCT/SE2021/051158, filed Nov. 19, 2021, which international application claims priority to and the benefit of Finish Application No. 20206192, filed Nov. 23, 2020; the contents of both of which are hereby incorporated by reference in their entirety.

TECHNICAL FIELD

The present disclosure relates to system and arrangement providing a receiver system and in particular a solution for flexible digital, analog or hybrid beamforming.

BACKGROUND

Antenna systems are known in the art and used to convert radio frequency fields into alternating current or converting alternating current into electromagnetic fields. Antenna arrays with a set of two or more antenna elements are commonly used in various applications to combine or process signals from the antenna array in order to achieve improved performance over that of a single antenna element.

Beamforming is a signal processing technique which may be achieved by combining elements in an antenna in specific ways and can be used for radio frequency signals. Beamforming can be deployed both at the transmitting and receiving ends of an antenna system. There are numerous applications for this such as within radar technology or telecommunications.

In the receiver end of an antenna there are conventionally three common type of beamforming types, hybrid, analog and digital beamforming. Digital beamforming provides the advantage of being able to combine data streams in different ways in parallel and thus allowing for a more flexible output. Analog beamforming provides for a single output thus being less flexible, but having other advantages such as lower power consumption. Hybrid beamforming type is a combination of analog beamforming and digital beamforming and is motivated by the higher capacity and the low power consumption of digital and analog beamforming.

Thus, each of the three beamforming types provide different benefits and drawbacks. Accordingly, there is no beamforming type that explicitly is better than the other and each of configurations excel in different scenarios.

Based on this, a receiver system that would provide the feature of being able to change its beamforming type based on each types suitability in varying environments would be beneficial. However, based on the current type of receiver system provided today, a changing between beamforming types would require separate parallel receiver system implementations, which in turn would lead to a costly and complicated implementation.

Thus, there is room for receiver system in the present art to explore the domain of providing a receiver system which can alternate between beamforming types while having a convenient design and operation compared to previous solutions. There is specifically a need in the present art for an improved receiver system having a convenient design, being cost-efficient, while providing the feature of being able to alternate between beamforming types.

Even though some currently known solutions work well in some situations it would be desirable to receiver system that fulfils requirements related to improving convenience in design and operation of receiver system while providing the feature of being able to alternate between an analog, digital and a flexible beamforming type.

SUMMARY

It is therefore an object of the present disclosure to provide a receiver system, a method of beamforming and a computer readable medium to mitigate, alleviate or eliminate one or more of the above-identified deficiencies and disadvantages. This object is achieved by means of a method for beamforming, a receiver system and a computer readable medium as defined in the appended claims.

The proposed solution makes it possible to alternate the beamforming type without having to implement separate parallel receiver implementations.

The present disclosure discloses a RF receiver system arranged to provide beamforming of incoming radio-frequency signals. The receiver comprises at least one digital signal processor, DSP, plurality of analog-to-digital converters, ADC, each connected to the at least one DSP, a plurality of sample-and-hold, S&H, circuit groups, each comprising a plurality of sample-and-hold circuits additively connected to a respective ADC, and a plurality of receiving antenna connections each connected to a respective S&H circuit in each group at one end and each antenna connection connected to a respective antenna at the other end. Further, the receiver system is configured to selectively alternate between a plurality of beamforming functionalities, wherein the receiver system is arranged to time-interleave the ADCs and control specific S&H circuits in each S&H group by one of time-interleave or disable specific S&H circuits depending on a set beamforming functionality.

A benefit of the RF receiver system is that it allows for the receiver system to selectively alternate between a plurality of beamforming functionalities. Accordingly, the receiver system may alternate between beamforming functionalities based on which environment the receiver system is operating in, allowing it to operate more optimally in varying environments. Thus, by controlling the S&H circuits and time-interleaving the ADCs the receiver system is able to alternate between the beamforming functionalities. The receiver system may alternate between beamforming functionalities without having any considerable hardware penalty.

The set beamforming functionality is one of analog, digital or hybrid beamforming. Thus, the RF receiver system may at least alternate between analog, digital or hybrid beamforming.

The RF receiver system may, when set to an analog beamforming functionality, be configured to combine incoming RF signals from the antennas prior to feeding the signals to each ADC. Further, when the RF receiver system is, when set to a digital beamforming functionality, it may be configured to disable at least one S&H circuit in each S&H group such that each antenna form a path to a separate ADC so to provide the incoming signals from each antenna to a corresponding ADC prior to combining the signals. Furthermore, when the receiver system is, when set to a hybrid beamforming functionality, it may be configured to disable at least one S&H circuit in each S&H group, wherein the signals received from the plurality of antennas are combined partly preceding being fed to the ADC and partly after being fed to the ADC.

Accordingly, there is minimal hardware-penalty for the RF receiver system when alternating between different beamforming functionalities. The difference in the RF receiver system between the beamforming functionalities is mainly the status on the S&H circuits, where some are disabled.

The DSP may be arranged to process signals from each ADC in respective manner depending on set beamforming functionality. Thus, the DSP may be configured to process signals according to at least first type, a second type or a third type based on which beamforming functionality which is present.

The respective manner comprise combining signals in different groups by either summing signals from each ADC in one summing function or combining two ADC signals before summing the summed signal in a later stage. A benefit of combining signals in different groups summing is that it allows for alternating between different beamforming functionalities in a flexible and rapid manner.

The number S&H groups may be equal to or less than the number of ADC.

The analog beamforming may be performed by true-time-delay analysis.

There is further provided a method of beamforming received radio-frequency, RF signals in a multi-antenna receiver system, the method comprising the steps of:
  setting a beamforming functionality of a plurality of beamforming functionalities
  receiving signals in a plurality of antenna connectors each connected to an antenna;
  providing the signals from each antenna connector to a respective sample-and-hold, S&H, circuit in a S&H group;
  based on the set beamforming functionality, time-interleaving or disabling at least one S&H circuit in each S&H group and providing specific signals to a respective analogue-to-digital converter, ADC, each connected to respective S&H group;
  time-interleaving the ADCs; and
  providing signals to a digital signal processor, DSP.

Furthermore, there is provided a computer readable storage medium storing one or more programs configured to be executed by one or more control circuitry of an RF receiver system, the one or more programs including instructions for performing the method as disclosed herein.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided receiver system and method, it will be apparent to one skilled in the art that the receiver system and method may be realized without these details. In other instances, well known constructions or functions are not described in detail, so as not to obscure the present disclosure.

Figure 1:
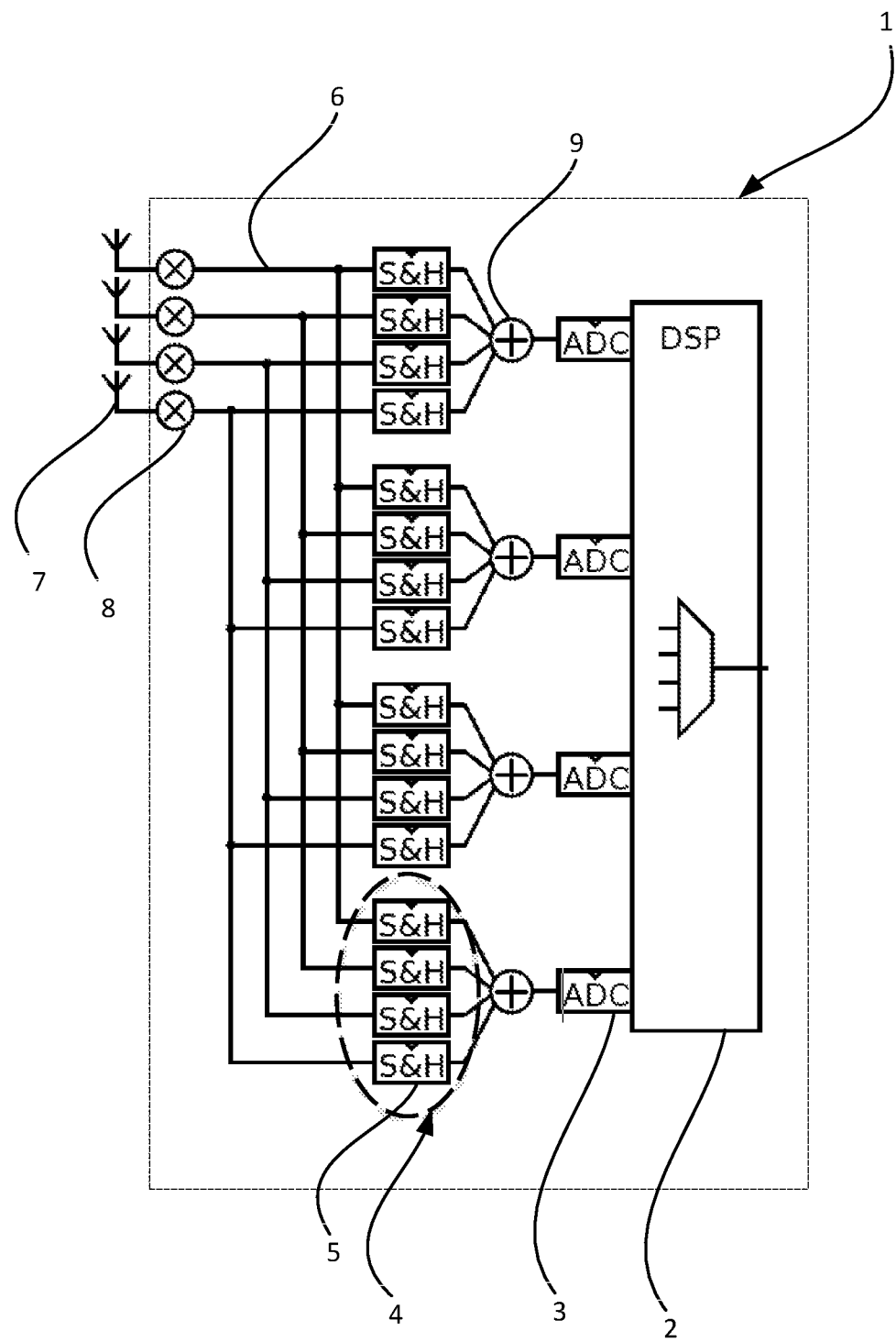
FIG. 1 schematically illustrates the circuitry of a receiver system in accordance with an embodiment of the present disclosure.

FIG. 1 illustrates a radio-frequency, RF receiver system 1 arranged to provide beamforming of incoming radio-frequency signals, the receiver system 1 comprising at least one digital signal processor, DSP 2, a plurality of analogue-to-digital converters, ADC 3, each connected to the at least one DSP 2, a plurality of sample-and-hold, S&H, circuit groups 4, each comprising a plurality of sample-and-hold circuits 5 additively connected to a respective ADC 3; and a plurality of receiving antenna connections 6 each connected to a respective S&H circuit 5 in each group at one end and each antenna connection 6 connected to a respective antenna 7 at the other end. The receiver system 1 is configured to selectively alternate between pluralities of beamforming functionalities, wherein the receiver system 1 is arranged to time-interleave the ADCs 3 and control specific S&H circuits 5 in each S&H group 4 by (at least) one of time-interleave or disable specific S&H circuits 5 depending on a set beamforming functionality.

The receiver system 1 in FIG. 1 comprises four antennas, wherein each antenna is connected to a stream/antenna connection 6 leading to a respective S&H circuit 5 in each group 4. The 4 antennas may be an antenna array, thus the antennas 7 in FIG. 1 comprises 4 sub-arrays. The number of sub-arrays may be equal to the number of antennas 7 divided with the number of streams/antenna connections 6. In some embodiments several antennas 7 may be connected to one antenna connection 6. In FIG. 1 there is shown four S&H circuit groups 4, wherein each S&H circuit group 4 comprises four S&H circuits 5, each S&H circuit 5 connected to an antenna 7. It should be noted that the receiver system 1 may comprise more or less than four antennas and more or less than four S&H circuits.

The term "time-interleave" may refer to the coordination of a plurality of lower sample rate devices to achieve a higher sample rate result or a higher frequency result e.g. a time-interleaved analog-to-digital converter 3 may coordinate the operations of two or more lower sample rate analog-to-digital converters 3 to obtain a digital output at a higher sample rate. Accordingly, it may replicate the effect of a single higher sample rate analog-to-digital converter 3 by combining the output of e.g. two ADC devices 3. Thus, time-interleaving may allow for the use of slower, more cost efficient components to produce high sample rate results that are more challenging to achieve with a single component. The term "time-interleave" may refer to the process of multiplexing at least two identical devices/circuits (e.g. S&H circuits or ADCs), this may be accomplished by providing each device with deviating clock signals so that the combined output provides for an effective sample rate higher than the sample rate of each single device.

The phrase "control specific S&H circuits in each group" refers to that in a S&H group 4 with at least a pair of S&H circuits 5, each individual S&H circuit 5 may be controlled by e.g. being disabled or active with time-interleaving.

The present disclosure provides a receiver system 1 that may comprise time-interleaving in the S&H circuits 5 and the ADC 3. Accordingly, by having time-interleaving present in both the S&H circuits 5 and the ADC 3 allows for the receiver system 1 to flexibly alternate between beamforming functionalities (e.g. by disabling components and summing signals at different stages of the receiver system) in an efficient way without hampering the performance of each beamforming functionality.

The DSP 2 may be arranged to process signals from each ADC 3 in respective manner depending on set beamforming functionality.

The respective manner comprise combining signals in different groups by either summing signals from each ADC 3 in one summing function or combining at least two ADC signals before summing a combined signal (i.e. the at least two combined ADC signals) in a later stage.

The number S&H groups 5 may be equal to or less than the number of ADC 2.

Figure 5:
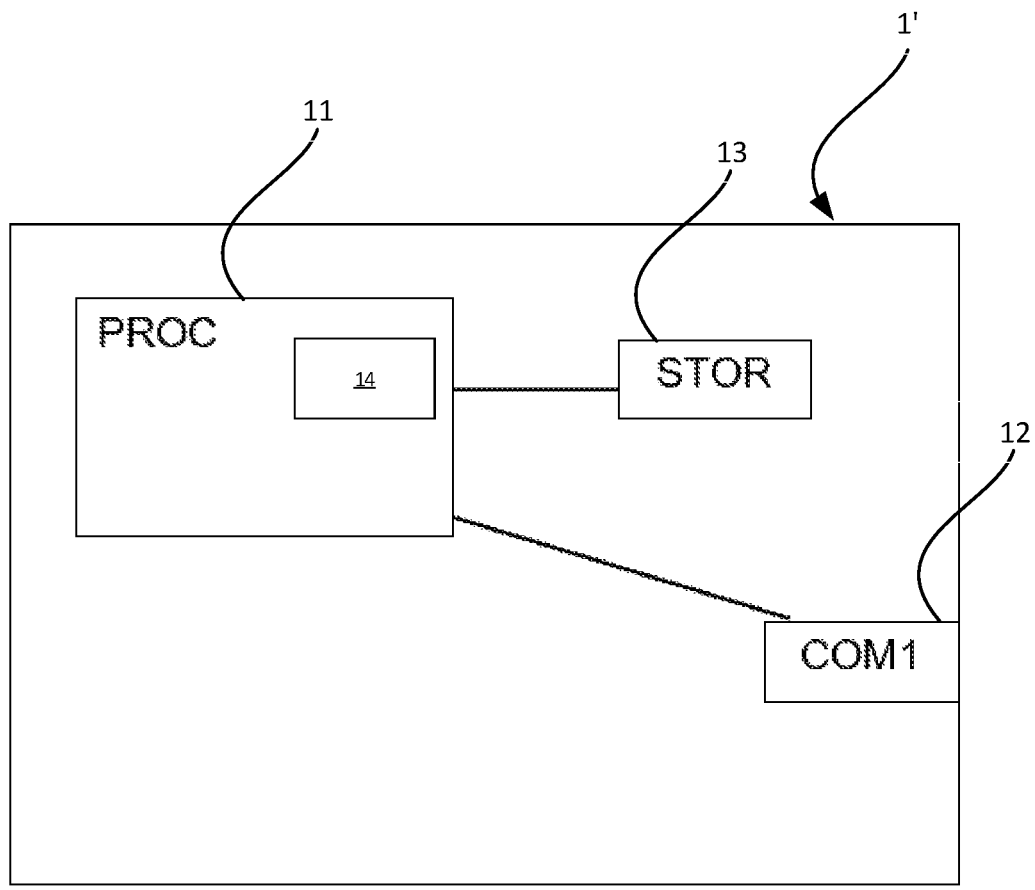
FIG. 5 is a schematic block diagram illustrating a control device for controlling the receiver system illustrated in FIG. 1.

As illustrated in FIG. 1 the receiver system 1 may comprise any suitable circuitry for enabling performance of the receiver system 1. The receiver system 1 may comprise a mixer 8 (e.g. for up/down conversion), local oscillators (not shown) and additive circuit/mixer 9. Further devices and circuitry that the system 1 may comprises is shown in FIG. 5.

The set beamforming functionality may be one of analogue, digital or hybrid beamforming. Thus, the receiver system 1 as shown in FIG. 1 may selectively alternate between analogue, digital or hybrid beamforming without any significant hardware penalty.

The DSP 2 may be arranged to process signals from each ADC 3 in a respective manner depending on set beamforming functionality. Thus, the DSP 3 may, based on the set beamforming functionality, process signals accordingly. The respective manner may comprise combining signals, by either summing signals from each ADC 3 in one summing function or combining (or summing) a part of the ADC signals before summing the combined signal in a later stage.

Figure 2:
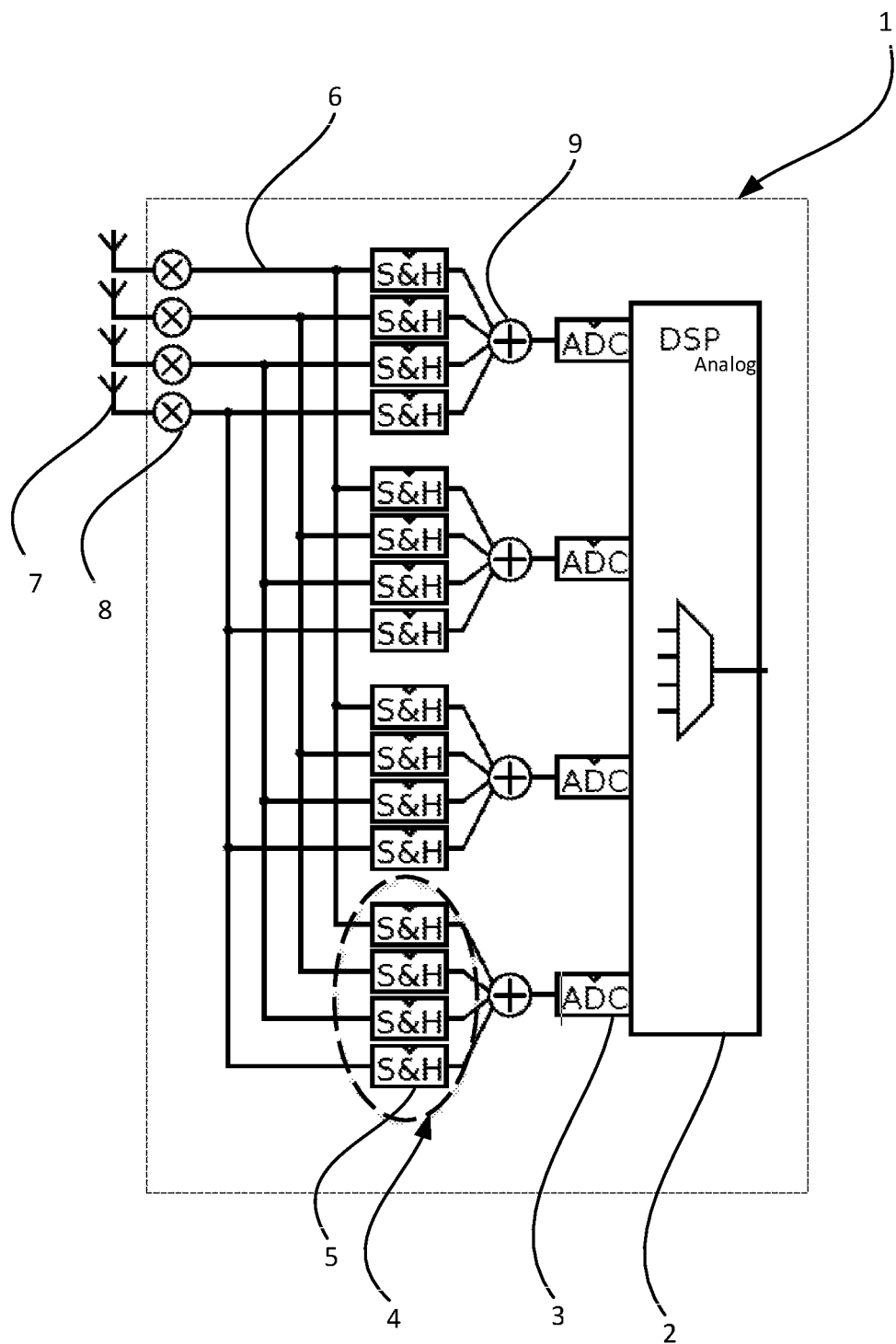
FIG. 2 schematically illustrates the receiver system in FIG. 1 set to an analog beamforming functionality in accordance with an embodiment of the present disclosure.

FIG. 2 illustrates the receiver system 1 as shown in FIG. 1, when set to an analog beamforming functionality. Time-interleaving in the S&H circuits 5 may allow for the receiver system 1 to extend the maximum implementable beamforming delay at least when set in the analog beamforming functionality. Further, time-interleaving in the ADC 3 may result in increases in signal bandwidth at least in the analog beamforming functionality. As shown in FIG. 2, the RF receiver system 1 is, when set to an analog beamforming functionality, configured to combine incoming RF signals from the antennas 7 prior to feeding the signals to each ADC 3. The signals may be combined in an additive mixer. In an analog beamforming functionality, clock signals of the S&H circuits are tuned for beamforming.

Figure 3:
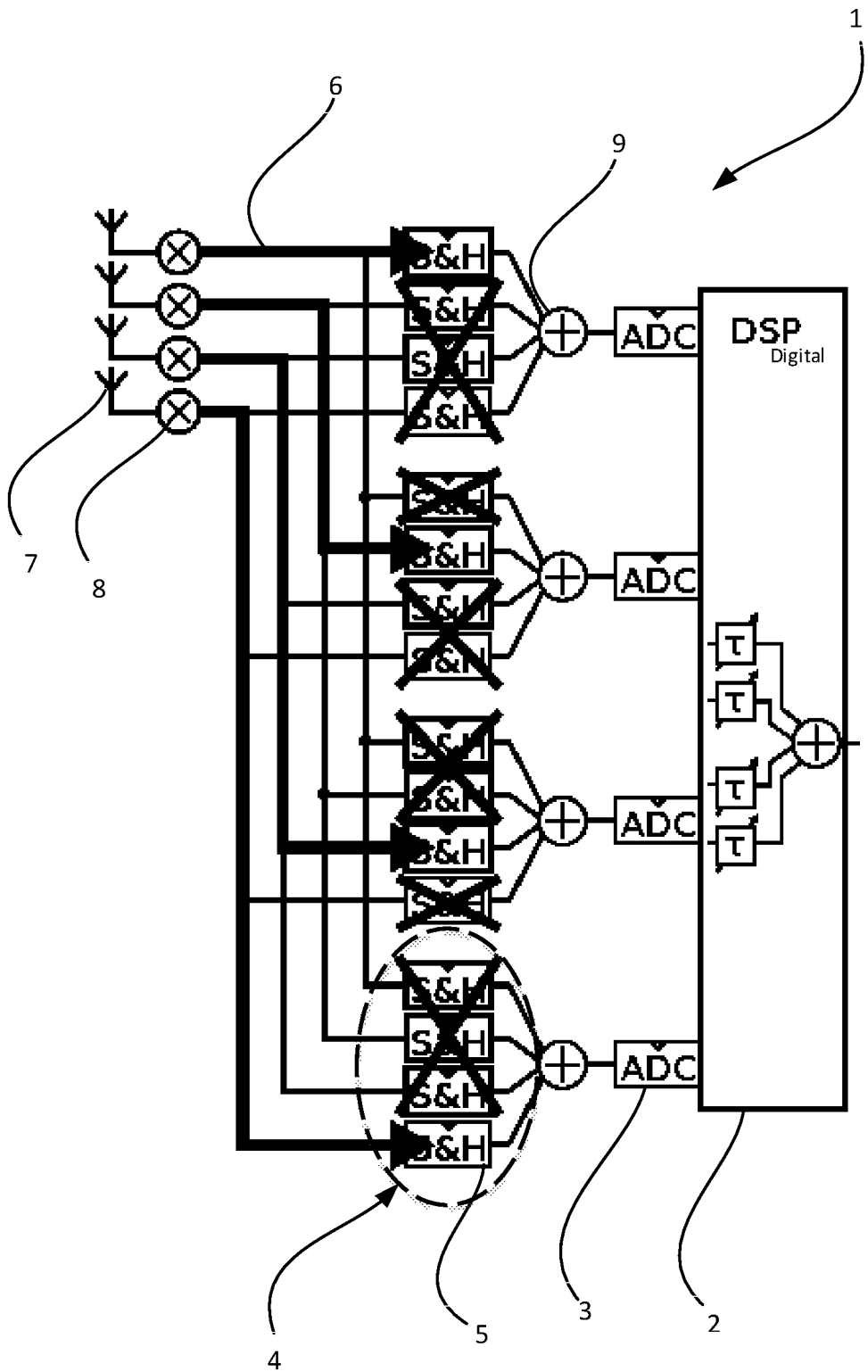
FIG. 3 schematically illustrates the receiver system in FIG. 1 set to a digital beamforming functionality in accordance with an embodiment of the present disclosure.

FIG. 3 illustrates the receiver system 1 as shown in FIG. 1, when set to a digital beamforming functionality. As shown in FIG. 3, when set to a digital beamforming functionality, the receiver system 1 is configured to disable at least one S&H circuit 5 in each S&H group 4 such that each antenna 7 form a path to a separate ADC 3. In FIG. 3, ¾ S&H circuits 5 in each group 4 are disabled. Further, in the digital beamforming functionality, incoming signals from each antenna 7 are provided to a corresponding ADC 3 prior to combining any signals. Thus, at least one time-interleaving streams/antenna connections 6 are disabled in the front end of the receiver system 1 (i.e. prior to the ADC). In FIG. 3, the time-interleaving ADCs 3 are split into separate ADC 3 for each antenna 6 so that each of the four antennas lead to one corresponding ADC only. Further, the signals are combined after passing the ADC 3 in the receiver system 1.

Figure 4:
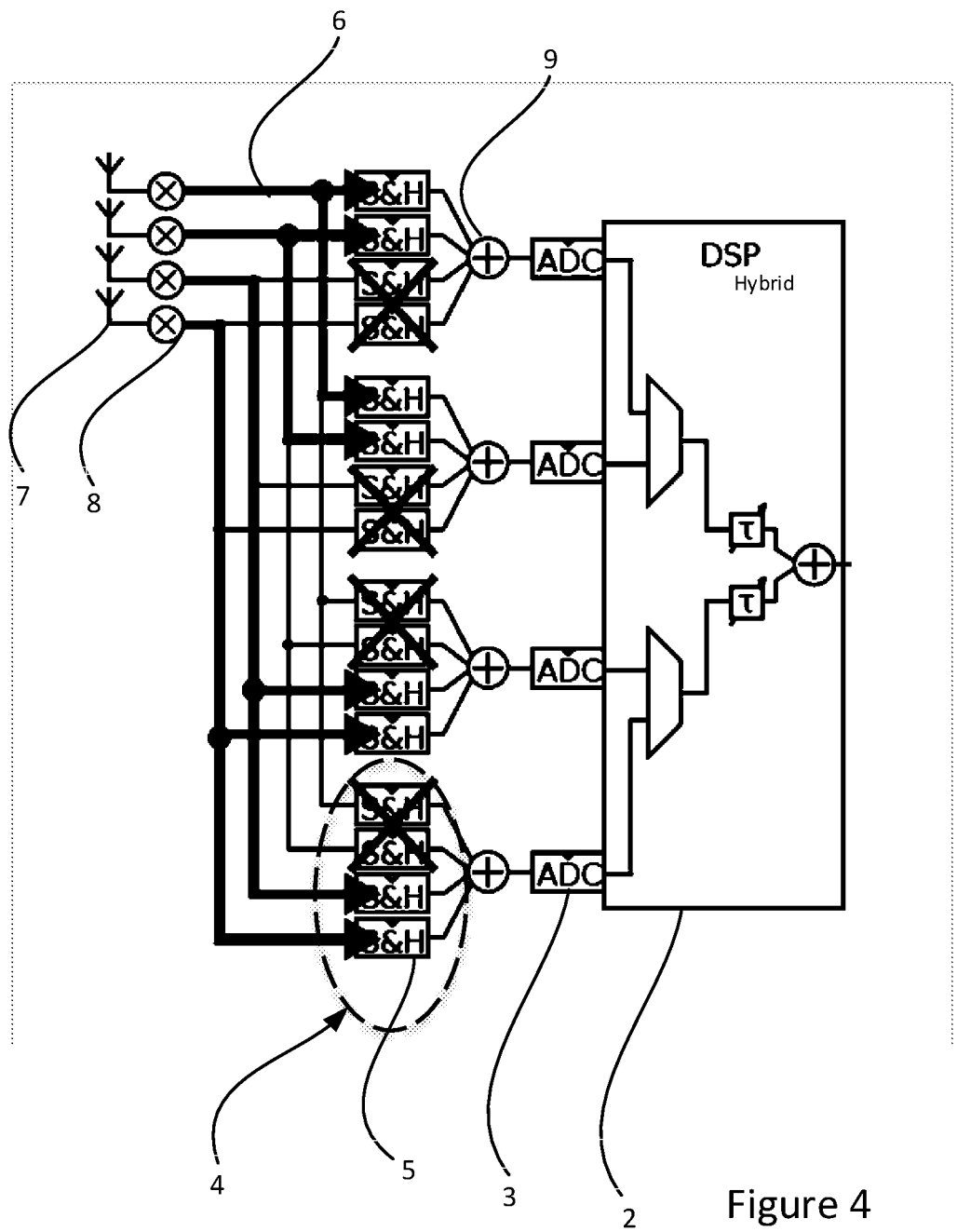
FIG. 4 schematically illustrates the receiver system in FIG. 1 set to a hybrid beamforming functionality in accordance with an embodiment of the present disclosure.

FIG. 4 illustrates the receiver system 1 as shown in FIG. 1, when set to a hybrid beamforming functionality. As shown in FIG. 4, when the receiver system 1 is set to a hybrid beamforming functionality, it's configured to disable at least one S&H circuit 5 in each S&H group 4 wherein the signals received from the plurality of antennas 7 are combined partly preceding being fed to the ADC 3 and partly after being fed to the ADC 3. Hybrid beamforming is a beamforming functionality that combines analog beamforming and digital beamforming. In FIG. 4, analog beamforming is performed prior to the signals being forwarded to the ADC 3. Further as shown in FIG. 4 (after analog beamforming is performed), the DSP may be configured to firstly, De-multiplex to combine at least two time interleaved ADCs 3, and secondly, delay by means of at least one tunable delay module, r and further, sum the at least two combined ADC to create digital beamforming. Accordingly, the signals are combined partly prior to being fed to the ADC and partly after being processed by the ADC.

As seen in the FIGS. 3-5, in digital and hybrid beamforming, there is beamforming inside the DSP 2, thus there is a tunable delay, r (seen in FIGS. 3 and 4) in the DSP 2. However, in analog beamforming there is no beamforming in the DSP, accordingly in an analog beamforming functionality, the clock signals of the S&H are tuned in order to beamform. In the hybrid beamforming functionality, the clock signals of the S&H are also tuned in order to beamform, based on that the hybrid beamforming functionality is an intermediate of analog and digital beamforming.

FIG. 5 illustrates a control device 1' for control of the receiver system 1 as shown in FIG. 1 schematically. The control device 1' and the receiver system 1 may be integrated. As seen in FIG. 5, control device 1' may comprise at least one control circuitry 11, at least one memory device 12 and a communication interface 13.

As illustrated in FIG. 5, the control device 1' may comprise one or more memory devices 12, communication interfaces 13 and control circuitry 11. The memory device 12 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 11. Each memory device 12 may store any suitable instructions, data or information, including a computer program, software, an application including one or more of logic, rules, code, tables, etc. and/or other instructions capable of being executed by the control circuitry 11 and, utilized. Memory device 12 may be used to store any calculations made by control circuitry 11 and/or any data received via the communication interface 13. In some embodiments, each control circuitry and each memory device may be considered to be integrated. The DSP 2 may also comprise at least one memory device 12 and communication interfaces 13. Further, according to some embodiments, the DSP 2 may control the beamforming functionality operation. The control circuitry 11 may be integrated with the DSP 2.

Each memory device 12 may also store data that can be retrieved, manipulated, created, or stored by the control circuitry 11. The data may include, for instance, local updates, parameters, training data, learning models and other data. The data can be stored in one or more databases. The one or more databases can be connected to the server by a high bandwidth field area network (FAN) or wide area network (WAN), or can also be connected to server through a communication network.

The control circuitry 11 may include, for example, one or more central processing units (CPUs), dedicated to performing calculations, and/or other processing devices. The memory device 12 can include one or more computer-readable media and can store information accessible by the control circuitry 11, including instructions/programs that can be executed by the control circuitry 11.

The instructions which may be executed by the control circuitry 11 may comprise instructions for implementing the beamforming functionalities according to any aspects of the present disclosure. As seen in FIG. 5, the control circuitry 11 may comprise a functionality selecting module 14 which may be configured to set and/or alternate between the beamforming functionalities of the receiver system 1. Accordingly, when the receiver system 1 is alternated between e.g. an analog beamforming functionality to a digital beamforming functionality, the functionality selecting module 14 may be configured disable, specific S&H circuits 5 so to arrange for said digital beamforming functionality.

Figure 6:
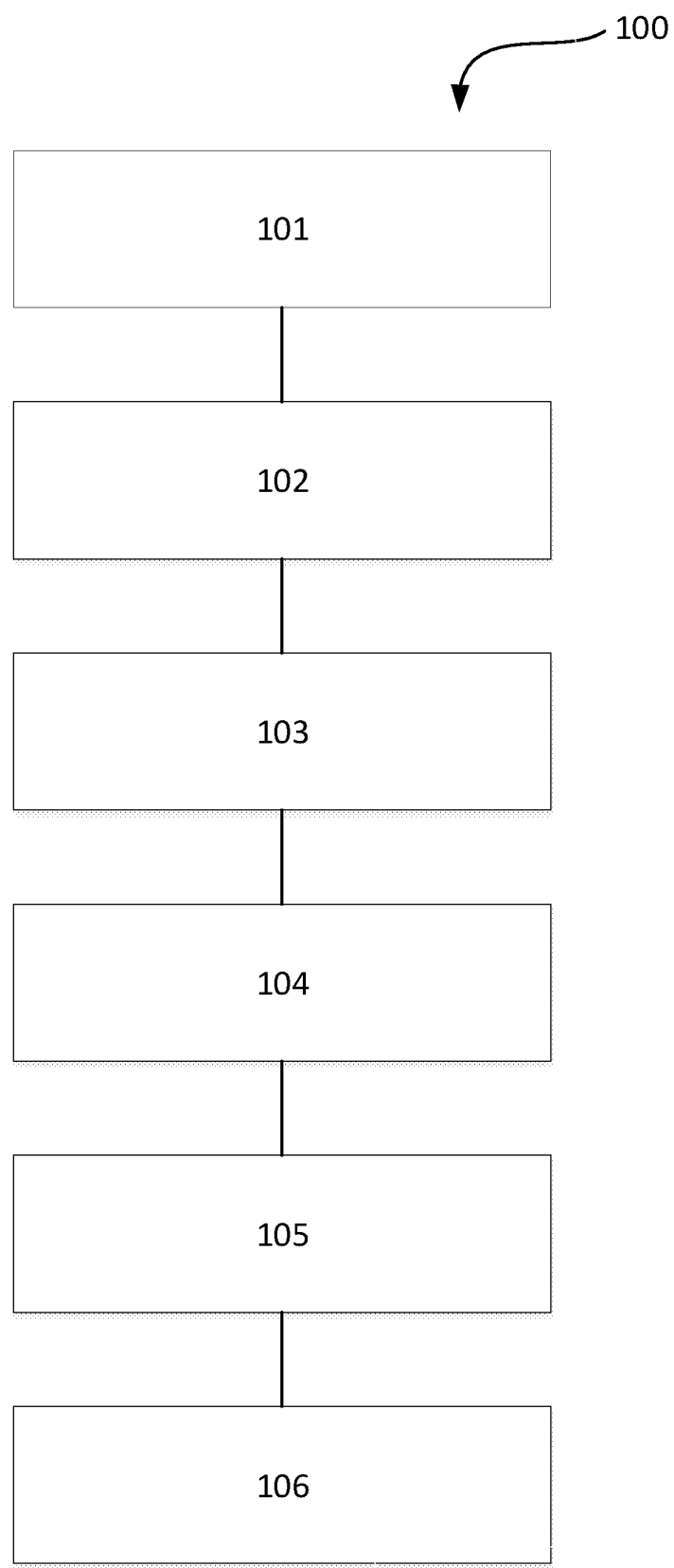
FIG. 6 is a schematic block diagram illustrating an exemplary method of beamforming.

As shown in FIG. 6, there is further provided a method 100 of beamforming received radio-frequency, RF signals in a multi-antenna receiver system, the method comprising the steps of: setting 101 a beamforming functionality of a plurality of beamforming functionalities. Receiving 102 signals in a plurality of antenna connectors each connected to an antenna. Providing 103 the signals from each antenna connector to a respective sample-and-hold, S&H, circuit in a S&H group. Further, based on the set beamforming functionality, time-interleaving or disabling 104 at least one S&H circuit in each S&H group and providing specific signals to a respective analogue-to-digital converter, ADC, each connected to respective S&H group. Further, time-interleaving the ADCs; and providing signals to a digital signal processor, DSP. The steps in the method 100 are not bound to a specific order. In other words, e.g. the receiver system may set a beamforming functionality preceding the step of receiving signals in the antenna connectors.

Figure 7:
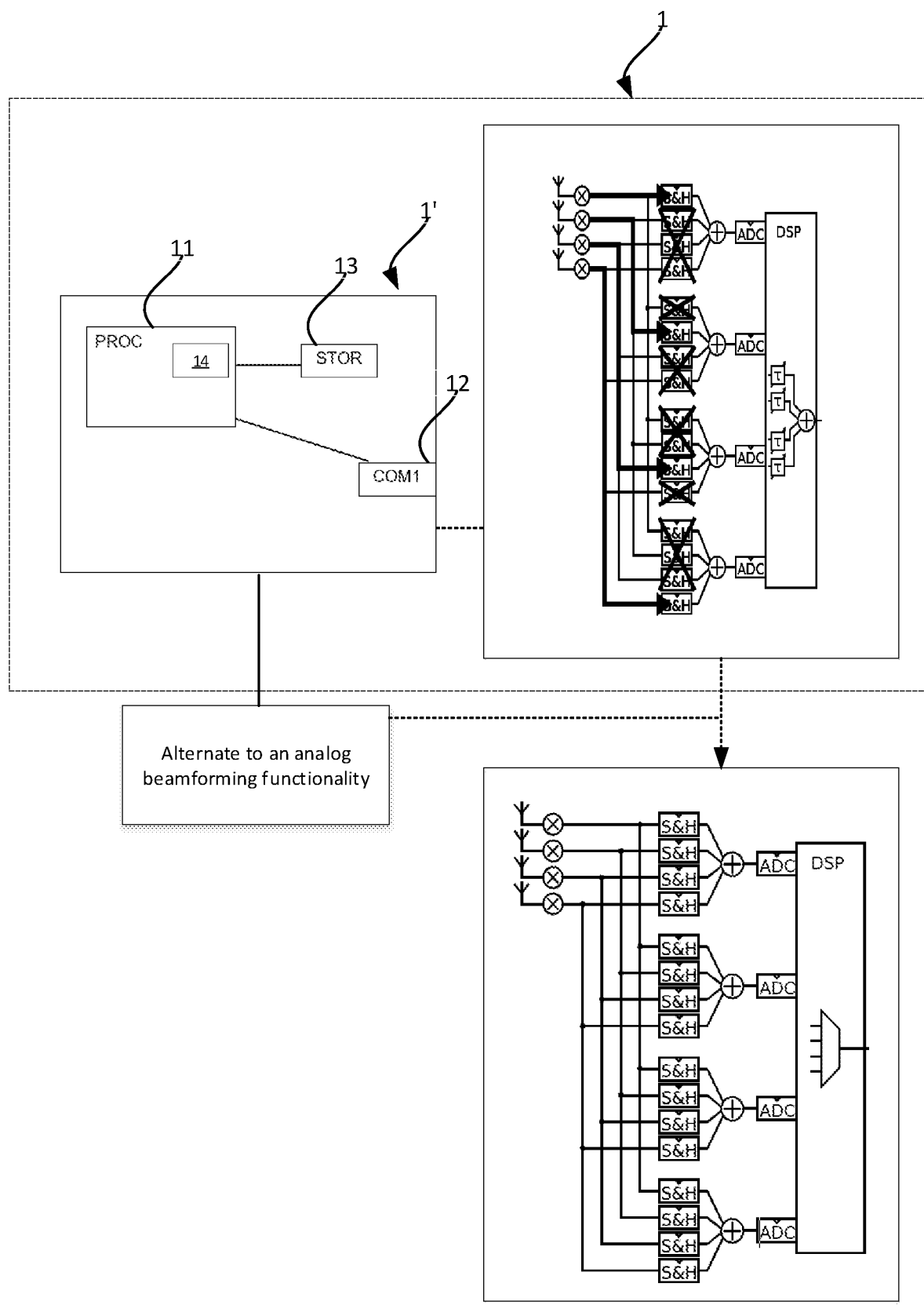
FIG. 7 is a schematic block diagram illustrating a control device controlling beamforming functionalities in accordance with an embodiment of the present disclosure.

FIG. 7 shows the system when alternating from a hybrid beamforming functionality to an analog beamforming functionality. As shown in FIG. 7, the control device 1' may control the operation of the receiver system 1, so to alternate between beamforming functionalities. Thus, the control device 1' may send a control signal so to alternate between different beamforming functionalities.

Figure 8:
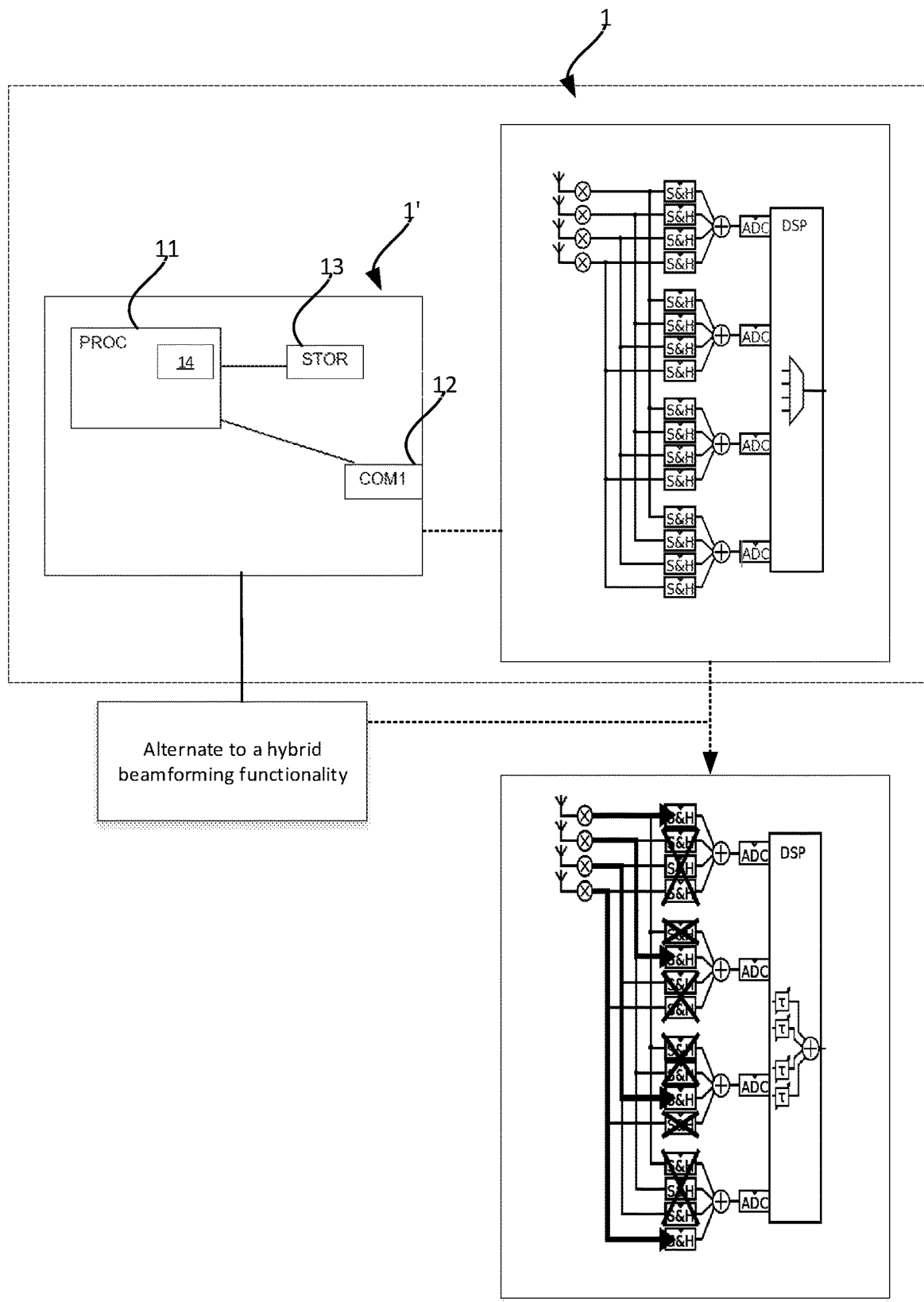
FIG. 8 is a schematic block diagram illustrating a control device controlling beamforming functionalities in accordance with an embodiment of the present disclosure.

FIG. 8, shows the system 1 when alternating from an analog beamforming functionality to a digital beamforming functionality. Accordingly, the control device 1' may selectively alternate the beamforming functionality of the system 1.

Figure 9:
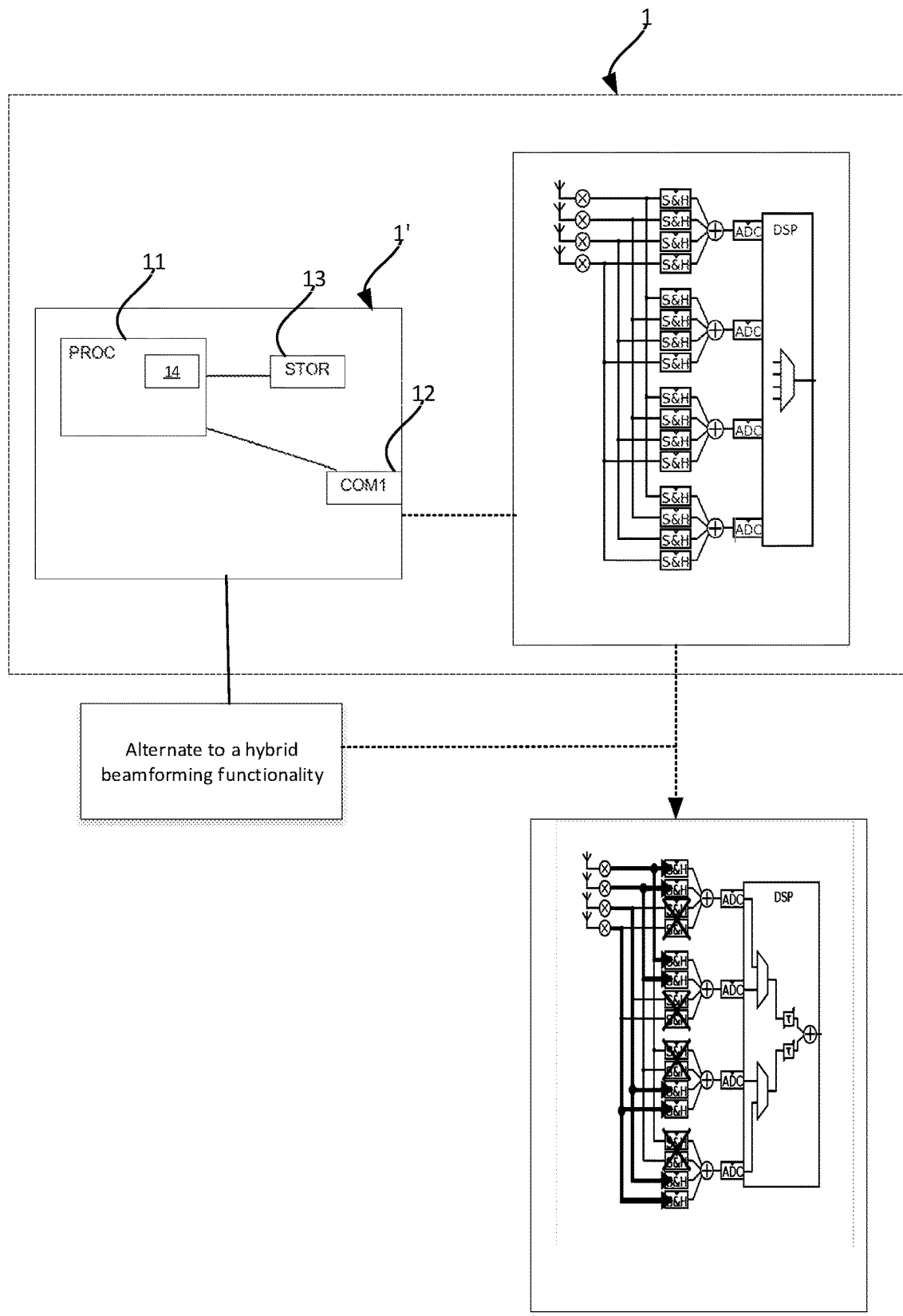
FIG. 9 is a schematic block diagram illustrating a control device controlling beamforming functionalities in accordance with an embodiment of the present disclosure.

FIG. 9 shows the system 1 when alternating from an analog beamforming functionality to a hybrid beamforming functionality.

In accordance with the FIGS. 7-9, the control device 1' may control the beamforming functionalities of the system 1. The control device 1' may send control signals so to disable S&H circuits 5, control the time interleaving of the S&H circuits 5 (e.g. the multiplexing) and the ADCs 3 and further also allow the DSP 2 to process signals based on the set beamforming functionality set by the control device 1'.

There may further be provided a computer readable storage medium storing one or more programs configured to be executed by one or more control circuitry of an RF receiver system, the one or more programs including instructions for performing the method as disclosed herein.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:
1. A radio-frequency (RF) receiver system (1) arranged to provide beamforming of incoming radio-frequency signals, the RF receiver system (1) comprising:
 at least one digital signal processor (DSP) (2);
 a plurality of analogue-to-digital converters (ADCs) (3), each connected to the at least one (DSP) (2);
 a plurality of sample-and-hold (S&H), circuit groups (4), each comprising a plurality of sample-and-hold circuits (5) additively connected to a respective ADC (3); and
 a plurality of receiving antenna connections (6) each connected to a respective S&H circuit (5) in each group (4) at one end and each antenna connection (6) connected to a respective antenna (7);
 wherein the RF receiver system (1) is configured to selectively alternate between a plurality of beamforming functionalities, wherein the RF receiver system (1) is arranged to time-interleave the ADCs (3) and control specific S&H circuits (5) in each S&H group (4) by at least one of time-interleave or disable specific S&H circuits (5) depending on a set beamforming functionality.

2. The RF receiver system (1) according to claim 1, wherein the set beamforming functionality is one of analogue, digital or hybrid beamforming.

3. The RF receiver system (1) according to claim 1, wherein the RF receiver system (1) is, when set to an analogue beamforming functionality, configured to:

combine incoming RF signals from the antennas (7) prior to feeding the signals to each ADC (3).

4. The RF receiver system (1) according to claim 1, wherein the RF receiver system is, when set to a digital beamforming functionality, configured to:
  disable at least one S&H circuit (5) in each S&H group (4) such that each antenna (7) form a path to a separate ADC (3);
  provide the incoming RF signals from each antenna (7) to a corresponding ADC (3) prior to combining the signals.

5. The RF receiver system (1) according to claim 1, wherein the RF receiver system (1) is, when set to a hybrid beamforming functionality, configured to:
  disable at least one S&H circuit (5) in each S&H group (4);
  wherein the incoming RF signals received from the plurality of antennas (7) are combined partly preceding being fed to the plurality of ADCs (3) and partly after being fed to the plurality of ADCs (3).

6. The RF receiver system (1) according to claim 5, wherein the signals are fed to at least one tunable delay module (τ) prior to being combined after being fed to the plurality of ADCs (3).

7. The RF receiver system (1) according to claim 1, wherein the at least one DSP (2) is arranged to process signals from each ADC (3) in a respective manner depending on set beamforming functionality.

8. The RF receiver system (1) according to claim 7, wherein the respective manner comprise combining signals by either summing signals from each ADC (3) in one summing function or combining a part of the ADC signals before summing a combined signal in a later stage.

9. The RF receiver system (1) according to claim 1, wherein a number of S&H groups (4) are equal to or less than a number of ADCs (3).

10. The RF receiver system (1) according to claim 2, wherein the analog beamforming is performed by true-time-delay analysis.

11. A method (100) of beamforming received radio-frequency signals in a multi-antenna receiver system, the method comprising:
  setting (101) a beamforming functionality of a plurality of beamforming functionalities
  receiving (102) signals in a plurality of antenna connectors each connected to an antenna;
  providing (103) the signals from each antenna connector to a respective sample-and-hold, (S&H), circuit in a (S&H) group;
  based on the setting of the beamforming functionality, time-interleaving or disabling (104) at least one S&H circuit in each S&H group and providing (105) specific signals to a respective analogue-to-digital converter, (ADC), each connected to respective S&H group;
  time-interleaving (106) the ADCs; and
  providing (107) signals to a digital signal processor, (DSP).

12. A non-transitory computer readable storage medium storing one or more programs including instructions for performing the method (100) of claim 11.

13. The RF receiver system (1) according to claim 2, wherein the RF receiver system (1) is, when set to an analogue beamforming functionality, configured to:
  combine incoming RF signals from the antennas (7) prior to feeding the signals to each ADC (3).

14. The RF receiver system (1) according to claim 2, wherein the RF receiver system is, when set to a digital beamforming functionality, configured to:
  disable at least one S&H circuit (5) in each S&H group (4) such that each antenna (7) form a path to a separate ADC (3);
  provide the incoming RF signals from each antenna (7) to a corresponding ADC (3) prior to combining the signals.

15. The RF receiver system (1) according to claim 2, wherein the RF receiver system (1) is, when set to a hybrid beamforming functionality, configured to:
  disable at least one S&H circuit (5) in each S&H group (4);
  wherein the incoming RF signals received from the plurality of antennas (7) are combined partly preceding being fed to the plurality of ADCs (3) and partly after being fed to the plurality of ADCs (3).

16. A non-transitory computer readable storage medium storing one or more programs configured to be executed by one or more control circuitry (11) of the RF receiver system (1) of claim 1.

* * * * *